(12) United States Patent
Kojika et al.

(10) Patent No.: US 7,034,665 B2
(45) Date of Patent: Apr. 25, 2006

(54) ANTI-THEFT DEVICE INSTALLATION STRUCTURE FOR MOTORCYCLE

(75) Inventors: Ken Kojika, Wako (JP); Akihiko Yamashita, Wako (JP); Seiichi Yamashita, Wako (JP); Atushi Hatayama, Wako (JP); Motoharu Okumura, Asaka (JP)

(73) Assignees: Honda Giken Kogyo Kabushiki Kaisha, Tokyo (JP); Honda Access Corp., Saitama (JP)

( * ) Notice: Subject to any disclaimer, the term of this patent is extended or adjusted under 35 U.S.C. 154(b) by 458 days.

(21) Appl. No.: 10/112,489

(22) Filed: Apr. 1, 2002

(65) Prior Publication Data

US 2004/0036609 A1 Feb. 26, 2004

(30) Foreign Application Priority Data

Apr. 2, 2001 (JP) .............................. 2001-103082
Jan. 30, 2002 (JP) .............................. 2002-021277

(51) Int. Cl.
*B62J 3/00* (2006.01)
(52) U.S. Cl. ..................................... 340/427; 340/566
(58) Field of Classification Search ................ 340/427, 340/432, 566
See application file for complete search history.

(56) References Cited

U.S. PATENT DOCUMENTS

| 4,322,714 A | * | 3/1982 | Morgan .................... 340/427 |
| 4,641,124 A | | 2/1987 | Davis |
| 5,147,077 A | * | 9/1992 | Nakajima et al. ........... 224/413 |
| 5,534,847 A | * | 7/1996 | McGregor .................. 340/432 |
| 5,894,810 A | | 4/1999 | Orr |
| 6,028,507 A | | 2/2000 | Banks et al. |
| 6,046,687 A | | 4/2000 | Janky |
| 2002/0113491 A1 | * | 8/2002 | Eglit et al. .................. 307/9.1 |

FOREIGN PATENT DOCUMENTS

| DE | 3839959 | 4/1990 |
| EP | 1 018 457 | 7/2000 |

\* cited by examiner

*Primary Examiner*—Jeffery Hofsass
*Assistant Examiner*—George Bugg
(74) *Attorney, Agent, or Firm*—Wenderoth, Lind & Ponack, L.L.P.

(57) ABSTRACT

A structure is provided for installing in a motorcycle an anti-theft device capable of reporting its position by wirelessly transmitting at least identifying information utilizing the GPS or PHS positioning system. The structure includes a receptacle and an openable cover that can be locked to secure the receptacle, and the anti-theft device is installed in the receptacle. The receptacle can be a helmet box formed in the motorcycle and a cover that can be an openable and lockable motorcycle seat. The structure conceals the anti-theft device, protects it from vibration and invasion of rainwater, and can include a case with enhanced waterproofing capability in which the anti-theft device is accommodated so that an indicator thereof is visible through a transparent window.

22 Claims, 19 Drawing Sheets

ANTI-THEFT DEVICE INSTALLATION STRUCTURE FOR MOTORCYCLE

BACKGROUND OF THE INVENTION

1. Field of the Invention

This invention relates to a structure for installing an anti-theft device in a motorcycle, particularly to a structure for installing in a motorcycle an anti-theft device comprising a communications device capable of reporting its current position by wirelessly transmitting at least identifying information.

2. Description of the Prior Art

Various different inventions for preventing vehicle theft have been reported.

Japanese Unexamined Patent Publication No. 61-30450 teaches a vehicle theft prevention device including theft detection means, signal transmission means and an alarm device installed in the vehicle, and a display carried by the vehicle owner that displays a theft detection message received from the vehicle and can be operated to transmit a signal for activating the alarm device.

The vehicle anti-theft device taught by Japanese Patent No. 2,665,478 has a theft detector and a position detector installed in a vehicle. When the detector detects that the vehicle has been stolen, it activates the position detector to automatically transmit position information thereafter.

The artificial satellite-based Global Positioning System (GPS) that has become widely available for practical applications in recent years makes it possible to acquire accurate information on current position by picking up signals transmitted by the system's satellites.

Moreover, recent advances in wireless telecommunications system technologies have led to the implementation of a positioning service utilizing the PHS (Personal Handyphone System). This service can pinpoint the position of a PHS communications terminal from the base station that covers the wireless telecommunications service area where the terminal is located.

This means that a communications terminal can inform a person, such as its owner or administrator, located at remote location of its current position by wirelessly transmitting at least its identifying information by, when using the GPS, wirelessly transmitting its current position acquired from the GPS and its identifying information or, when using the PHS, wirelessly transmitting its identifying information.

Installing such a communications terminal in a motorcycle as an anti-theft device would make it possible to locate the motorcycle more quickly when stolen, thanks to information transmitted from the anti-theft device.

The assignee has filed Japanese Patent Application No. 2001-9071 for a system suitable for vehicle anti-theft purposes that enables determination of the maker name, vehicle type, body color and other vehicle attributes when the vehicle is stolen.

The assignee also applied for the invention taught by Japanese Unexamined Patent Publication No. 2001-196529, which enables a mobile telephone unit that is capable of detecting theft by use of a G sensor and of informing the unit user of the theft, to be protected against theft by placing it in a trunk formed under the seat of a motorcycle and locking the seat to serve as a trunk cover when the motorcycle is parked.

However, the prior art does not offer an installation structure for an anti-theft device that is specifically suitable for a motorcycle.

Specifically, no installation structure has been proposed that meets the requirement that an anti-theft device designed to wirelessly report motorcycle theft must be installed where the thief cannot find it and therefore cannot detach it. Although such an installation site is readily available in a car with lockable doors, securing an installation site that is both lockable and out of sight in a motorcycle is exceedingly difficult because almost every portion of a motorcycle is exposed.

Moreover, an anti-theft device with wireless telecommunications capability is equipped with one or more indicators for showing its operating condition, such as whether it is being properly supplied with power and operating normally. When installed out of sight, therefore, some provision must be made for enabling the user to easily check the indicator when necessary.

In addition, a motorcycle is exposed to the exterior substantially throughout and is also subject to considerably more vibration during driving than a car. The anti-theft device therefore has to be protected from rainwater etc. and to be isolated from vibration so as to protect it from vibration-induced failure. No installation structure that realistically satisfies these needs has yet been developed.

This invention was accomplished in light of these circumstances and has as an object to provide a structure for installing a device capable of wirelessly transmitting theft-related information in a motorcycle, which realistically satisfies the foregoing requirements.

The above and other objects and features of the invention will become apparent from the following description.

SUMMARY OF THE INVENTION

The present invention achieves this object by providing a structure for installing in a motorcycle an anti-theft device capable of reporting its position by wirelessly transmitting at least identifying information, the structure comprises a receptacle and an openable cover that can be locked to secure the receptacle. The receptacle and cover are formed in the motorcycle and the anti-theft device is installed in the receptacle.

The anti-theft device installing structure for a motorcycle, according to the present invention, thus enables an anti-theft device that uses the GPS or PHS positioning system to report the position of a stolen vehicle to be installed in. for example, a helmet box or storage compartment located under the motorcycle seat and closed by the seat serving as an openable and lockable cover or in a storage compartment with lockable cover provide in a cowl. Therefore, the anti-theft device can be installed at a place that cannot be easily discovered by a person other than the owner so long as the cover remains locked, while the owner can readily check the indicator by unlocking and opening the cover, and the anti-theft device can be protected against invasion of rainwater.

In a preferred aspect of the invention, the anti-theft device installation structure for motorcycle further comprises a case for holding the anti-theft device that is formed at least at a portion to be attached to the motorcycle body side of an anti-vibration material and has a transparent portion through which an indicator of the anti-theft device can be viewed.

By placing the anti-theft device in the case and attaching the case to the motorcycle body side, therefore, the anti-theft device can be reliably protected against vibration and its indicator can be kept visible.

In another preferred aspect, the anti-theft device installation structure for motorcycle comprises a case for holding the anti-theft device that is constituted of a holder to be attached to the motorcycle body side and a cover attachable to the holder by a waterproof structure, at least at a portion of the holder to be attached to the motorcycle body side being formed of an anti-vibration material and the cover having a transparent portion through which an indicator of the anti-theft device can be viewed.

The case can be cylindrical. Since the structure of the case enables the holder and the cover to be separated, the anti-theft device can be readily inserted into and removed from the case. Ease of maintenance is therefore enhanced. Materials with different properties can be utilized for the holder and the cover. For example, the holder can be formed of a material with good anti-vibration property such as anti-vibration rubber and the cover can be formed of a material with good transparency property such as transparent resin. This simplifies case fabrication.

In another preferred aspect, the portion of the case that faces the motorcycle body is provided with a cushioning material.

For example, anti-vibration rubber, silicone grease, anti-vibration gel or the like is interposed between the case and the motorcycle body (e.g., the wall of the receptacle) to reliably protect the anti-theft device from vibration.

In another preferred aspect, the case is provided with an engagement member and a cord interconnecting the anti-theft device and an onboard battery of the motorcycle exits from the case, loops through the engagement member and continues on to the battery side.

Although the anti-theft device of the present invention can be operated using an internal battery as its only power source, it can continue to operate over a longer period if electrically connected through a cord with the onboard motorcycle battery so as to be supplied with power either directly or by charging an internal battery. However, if the cord interconnecting the anti-theft device and the motorcycle battery receives a strong pulling force for some reason, the connection between the cord and the anti-theft device is liable to be impaired or a gap is liable to be formed at the point where the cord exits the case to degrade the watertightness of the case. When the cord is looped through the engagement member, however, these problems can be avoided because the pulling force on the engagement member is prevented from being applied to the anti-theft device side.

In another aspect, the anti-theft device is installed between a wall of the receptacle and a lining sheet covering the wall.

In another aspect, the receptacle is formed with an internal recess, the anti-theft device is installed in the recess of the receptacle, and an opening of the recess is covered with a covering member.

While the anti-theft device can be installed in various modes in accordance with the present invention, the two modes defined by the two immediately preceding aspects of the invention provide particularly preferable structures that ensure ready availability of installation space unrestricted by time period or electrical component layout in the motorcycle, offer lockability and a high degree of concealment from the eyes of others, and provide the user with good visibility and maintainability.

The term "motorcycle" as termed with respect to the present invention is defined to include both those of the ordinary two-wheeled type and those of the similarly built three-wheeled type.

DESCRIPTION OF THE PREFERRED EMBODIMENTS

Figure 1:
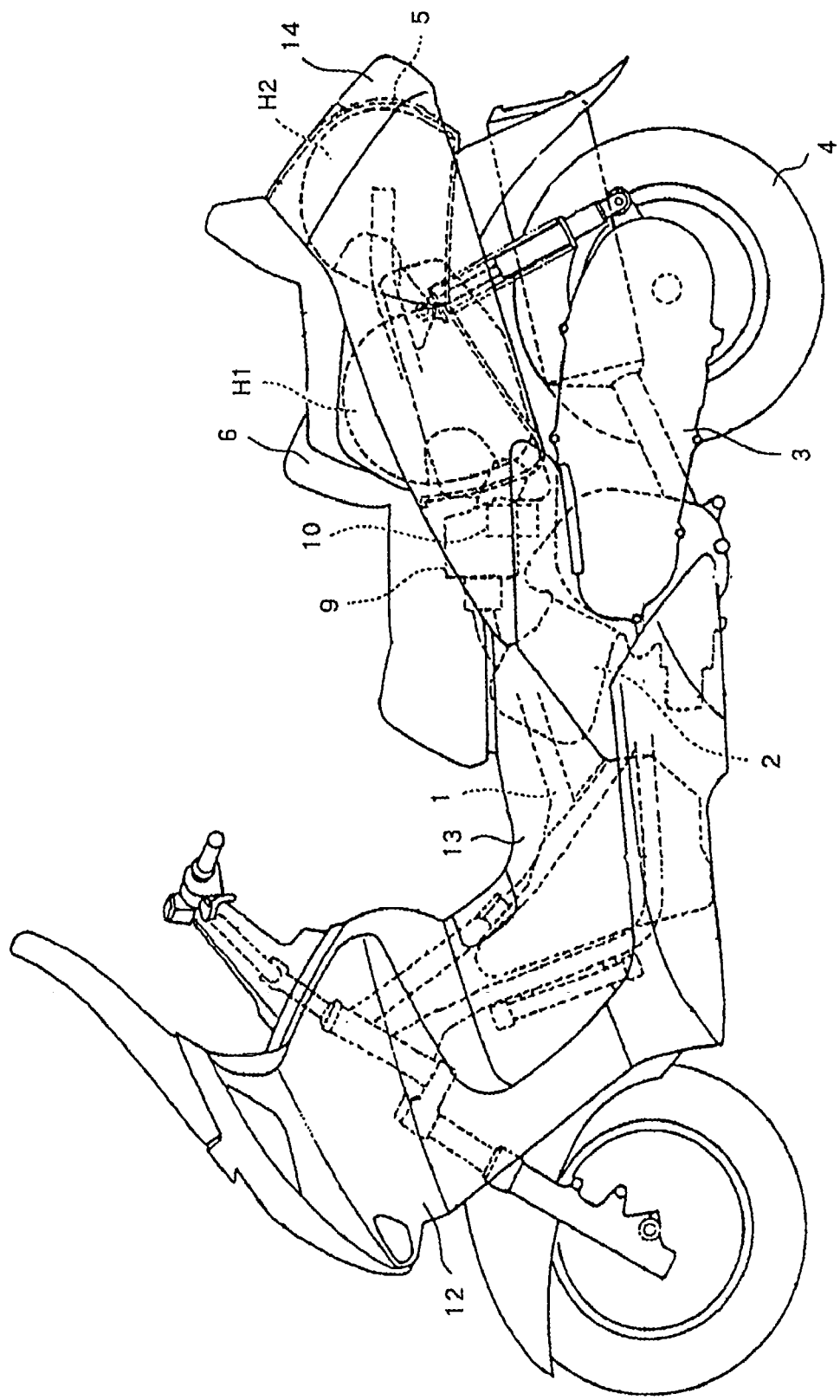
FIG. 1 is a side view of a motorcycle to which the present invention is applied.

The present invention will now be explicitly explained with reference to embodiments illustrated in the drawings.

Figure 2:
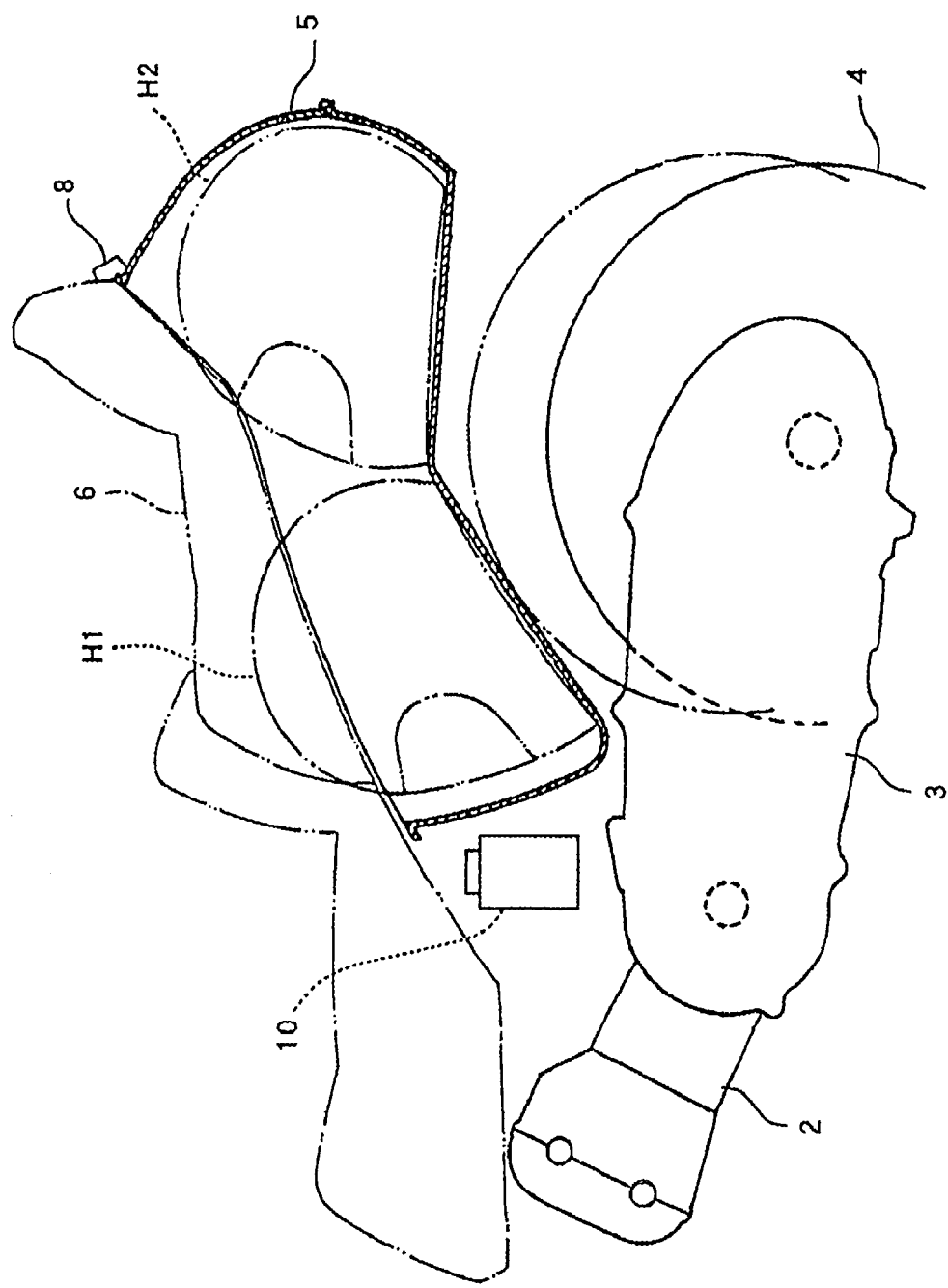
FIG. 2 is a side view showing a receptacle of the motorcycle.
Figure 3:
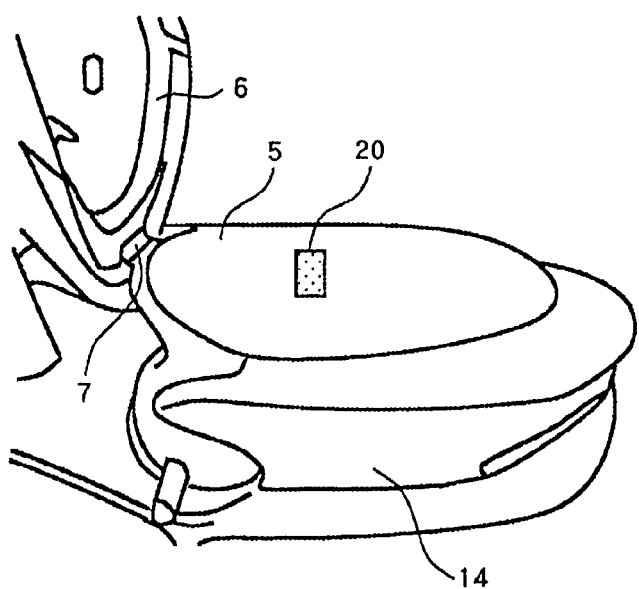
FIG. 3 is a perspective view showing the receptacle of the motorcycle.

FIG. 1 gives an overall view of a motorcycle, of the type commonly referred to as a "scooter," and FIGS. 2 and 3 show the vicinity of a storage box thereof.

This motorcycle has an engine 2 mounted at the approximate center of a body frame 1 that drives a rear wheel 4 throng a powertrain 3 attached to the engine 2 so as to be vertically swingable. A storage box 5 for holding helmets H1, H2 or the like is mounted on the rear of the body frame 1 (above the rear wheel 4). A seat is attached over the storage box 5 by a binge 7 at its forward edge so as to be movable between positions where it opens and closes the upper opening of the storage box 5.

The storage box 5 is provided at its rear portion with a lock mechanism 8. The seat 6 can be locked in the state of closing the storage box 5 by the lock mechanism 8. The locked storage box 5 can be opened by using a key to unlock the lock mechanism 8.

An air cleaner 9 and other auxiliary equipment are accommodated in a space above the engine 2 and below the seat 6. Engine electrical components and a battery 10 serving as a power source for an anti-theft device (explained later) are also accommodated in this space.

The body frame 1 of the motorcycle is covered by a body cover comprising a cowl-shaped front cover 12 covering the front portion of the body, a center cover 13 covering the center portion of the body, and a rear cover 14 covering the rear portion of the body.

Figure 4:
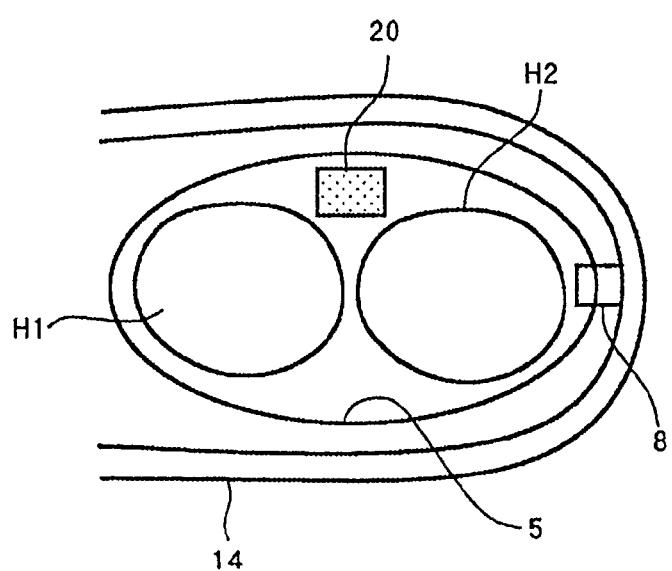
FIG. 4 is a plan view showing the receptacle of the motorcycle.

As shown in FIGS. 3 and 4, an anti-theft device 20 according to the present invention is provided in the storage box 5. In one preferred installation mode, the anti-theft device 20 is mounted on a side portion of the storage box 5 substantially at its center in the fore-aft direction of the motorcycle.

In the two-rider motorcycle illustrated in FIG. 1, the storage box 5 may sometimes contain two helmets H1, H2. When the anti-theft device 20 is mounted at the fore-aft center of the storage box 5, it can be installed utilizing a space formed between the two helmets. With this arrangement, the anti-theft device 20 can be installed while still maintaining space for accommodating the helmets in the storage box 5. Installation at this location is effective for use in the installation mode explained later with reference to FIG. 13.

Figure 5:
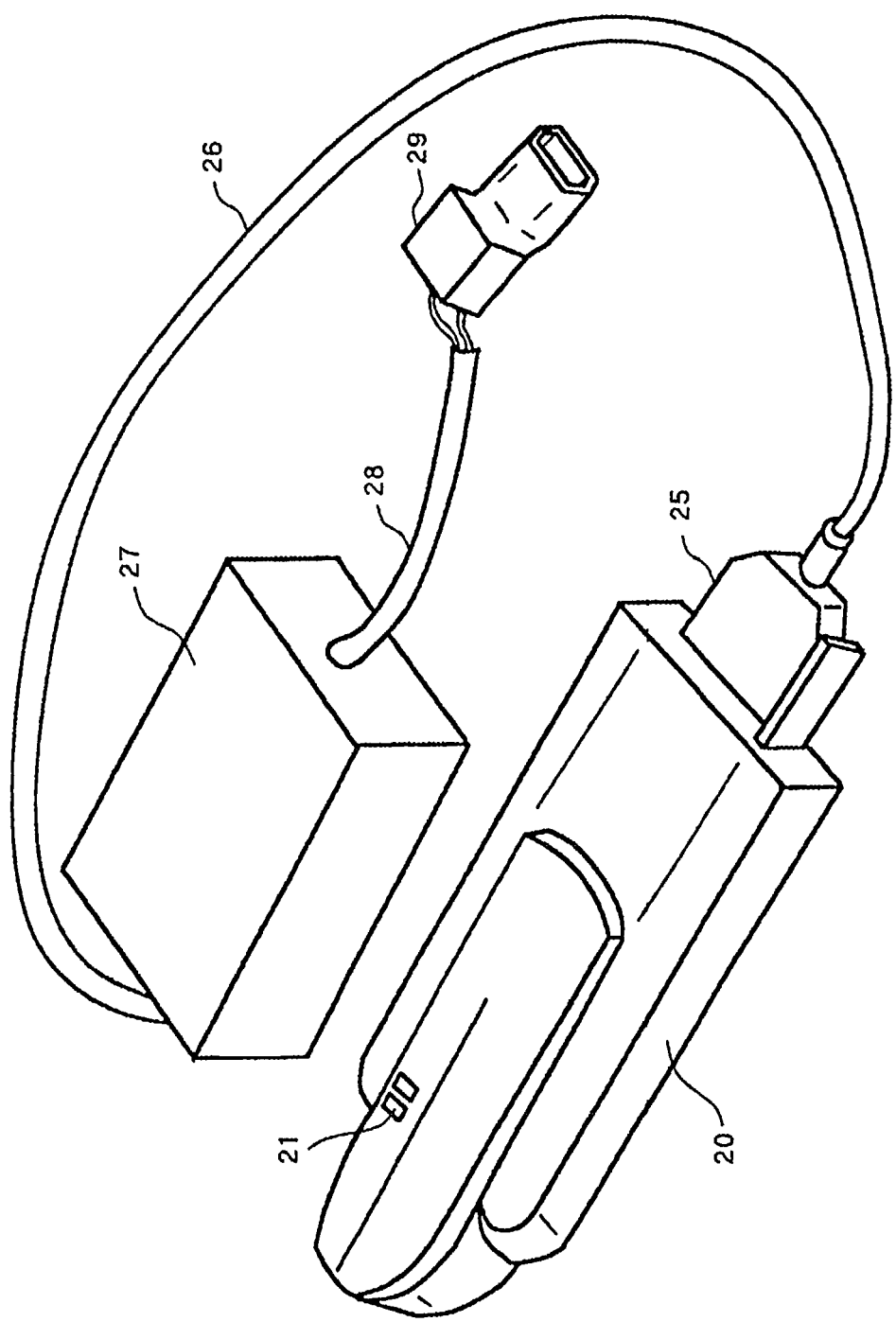
FIG. 5 is a perspective view showing an anti-theft device and a power supply system according to an embodiment of the present invention.

The anti-theft device 20 of this embodiment is illustrated in FIG. 5.

The anti-theft device 20 is an anomaly signaling terminal device such as taught by the assignee's Japanese Patent Application 2001-9071. It is capable of wirelessly transmitting at least identifying information enabling vehicle identification and utilizes the GPS or PHS system to automatically supply the vehicle owner or an administration center with information for determining the location of the vehicle when stolen.

The anti-theft device 20 can, for example, be a terminal device capable of producing and wirelessly transmitting an anomaly warning composed of interrelated information including theft information from a G sensor or other theft detecting means installed in the vehicle, identifying information uniquely identifying the vehicle stored in memory, attribute information indicating attributes like vehicle color and model stored in memory, and position information indicating the current vehicle location.

The anti-theft device 20 can, for example, also be a terminal device that uses a communications service operated utilizing a wireless telecommunications system equipped with a number of base stations. The terminal device is capable of producing an anomaly warning composed of interrelated information including theft information from theft detecting means installed in the vehicle, identifying information uniquely identifying the vehicle stored in memory, and attribute information indicating attributes like vehicle color and model stored in memory, and wirelessly transmitting the anomaly warning for reception by an administration unit capable of acquiring position information regarding the anomaly warning sender by using the identifying information contained in the anomaly warning to determine the base station that covers the wireless telecommunications service area where the warning sender is located.

The anti-theft device 20 can, for example, also be a terminal device capable of producing an anomaly warning composed of interrelated information including anomaly information from theft detecting means installed in the vehicle, identifying information uniquely identifying the vehicle stored in memory, and position information indicating the current vehicle location, and wirelessly transmitting the anomaly warning for reception by an administration unit capable of acquiring attribute information regarding the anomaly warning sender by using the identifying information contained in the anomaly warning to retrieve attribute information from a database containing attribute information regarding the vehicle.

The anti-theft device 20 can, for example, also be a terminal device installed in a vehicle for signaling anomaly occurrence in the vehicle that utilizes a communications service operated utilizing a wireless telecommunications system equipped with a number of base stations. This terminal device is capable of producing an anomaly warning composed of interrelated information including theft information from theft detecting means installed in the vehicle and identifying information uniquely identifying the vehicle stored in memory, and wirelessly transmitting the anomaly warning for reception by an administration unit capable of acquiring position information regarding the anomaly warning sender by using the identifying information contained in the anomaly warning to determine the base station that covers the wireless telecommunications service area where the warning sender is located, and acquiring attribute information regarding the anomaly warning sender by using the identifying information contained in the anomaly warning to retrieve attribute information from a database containing attribute information regarding the vehicle.

The anti-theft device 20 is equipped with an internal lithium battery or other such rechargeable battery as a power source. The internal battery is connected to an onboard charger 27 through a cord 26 connected to the anti-theft device 20 by a connector 25. The onboard charger 27 is connected to the onboard battery 10 through a cord 28 and a connector 29. When the anti-theft device 20 is installed in the motorcycle, the internal battery is charged by power from the onboard battery 10.

The anti-theft device 20 is equipped with an indicator 21 that indicates the charge condition and operating condition of the anti-theft device 20 by controlling light emitted from LEDs or the like.

Although the anti-theft device 20 can be waterproofed to a degree suitable for everyday purposes, secured by locking and concealed from sight by installing it in a lockable receptacle like the storage box 5, this embodiment enables installation that provides still higher levels of concealment, waterproofing and anti-vibration property by effecting the installation with the anti-theft device 20 enclosed in a case and also by implementing innovations in the installation structure.

Figure 6:
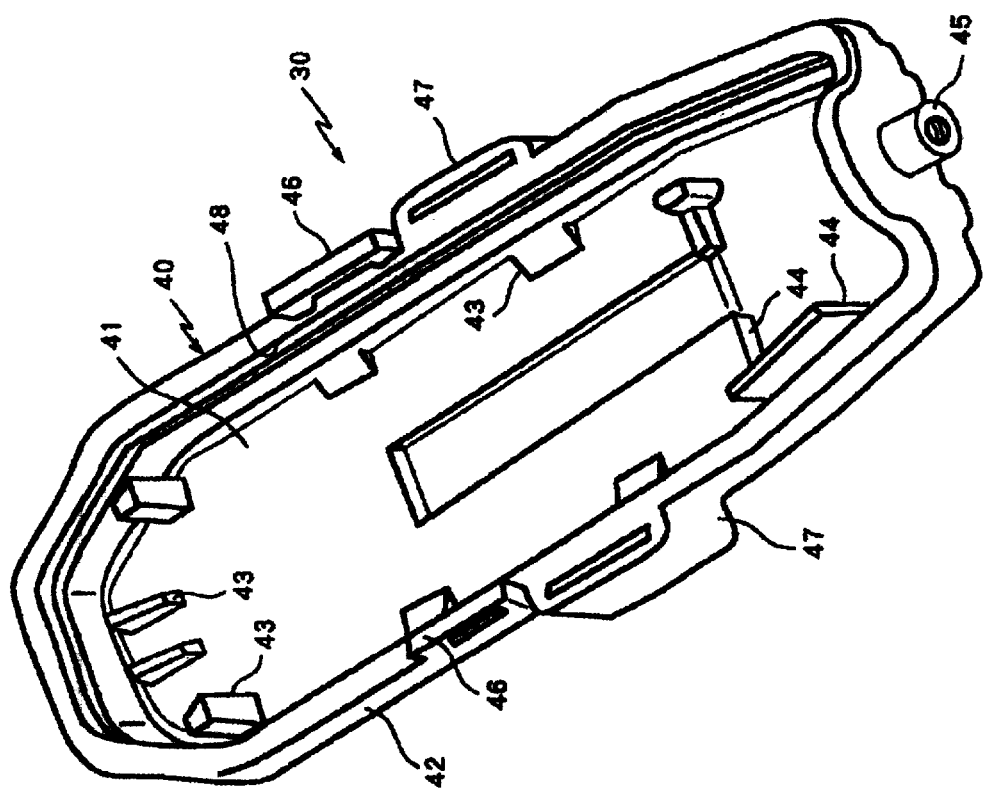
FIG. 6 is a perspective showing a case holder according to an embodiment of the present invention.
Figure 7:
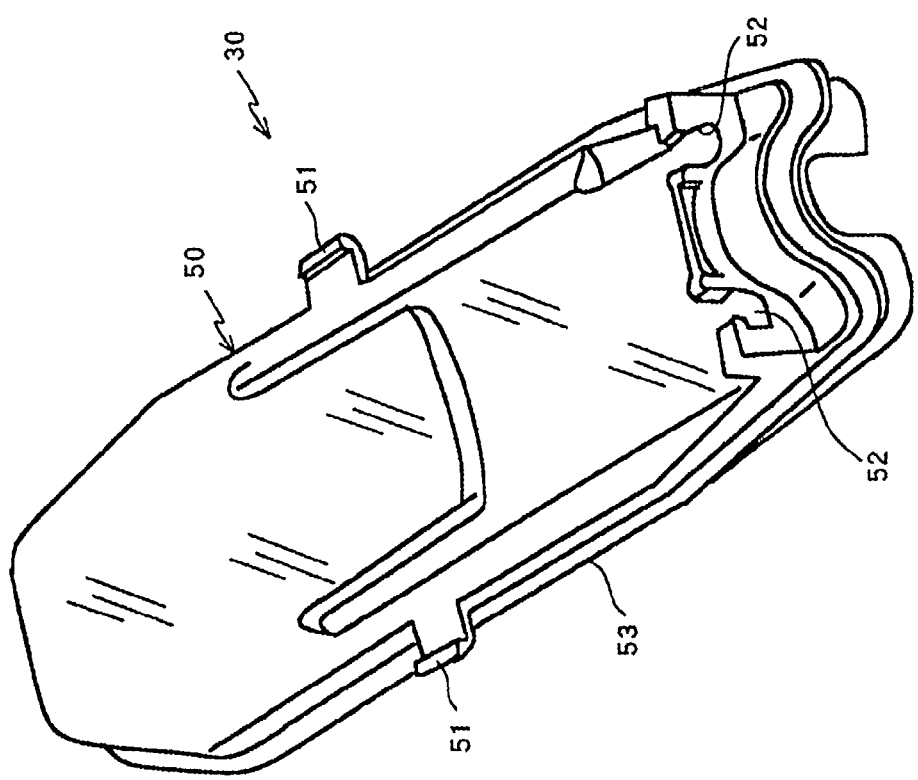
FIG. 7 is a perspective view showing a case cover according to an embodiment of the present invention.

FIGS. 6 and 7 show a case 30 for accommodating the anti-theft device 20. FIGS. 8 to 12 show the anti-theft device 20 installed in the case 30.

The case 30 has a split structure composed of a holder 40 shown in FIG. 6 and a cover 50 shown in FIG. 7. The holder 40 and the cover 50 mate to form a watertight integral structure that enables the anti-theft device 20 and the connector 25 to be accommodated inside a waterproof structure. As explained in detail later, the case 30 is mounted on a motorcycle body side member such as the storage box 5 by using an anti-vibration structure.

The holder 40 of the case 30 formed of a material having elasticity and waterproofing property (e.g., rubber). It is formed of a base plate 41 and a surrounding upright wall 42 so as to have a boat-like shape. The base plate 41 is formed at multiple locations with ribs 43 for engaging with and positioning the anti-theft device 20 and with ribs 44 for engaging with and positioning the connector 25. One end of the wall 42 is formed with a cylindrical member 45 for passing the cord 26 extending from the connector 25.

The wall 42 is formed approximately midway of its length with a pair of gate-like lugs 46 for engaging with the cover 50 and with a pair of gate-like lugs 47 for fastening to the motorcycle body side. The inner face of the wall 42 is formed with a continuous peripheral groove 48.

The cover 50 shown in FIG. 7 is made of transparent resin so that the indicator 21 can be viewed from the outside. It is formed approximately midway of its length with a pair of hooks 51 that engage with the gate-like lugs 46.

A pair of claw-shaped notches 52 for looping the cord 26 are formed on the ceiling of the cover 50. The periphery of the cover 50 is formed with a continuous flange 53 that fits into the peripheral groove 48.

Figure 8:
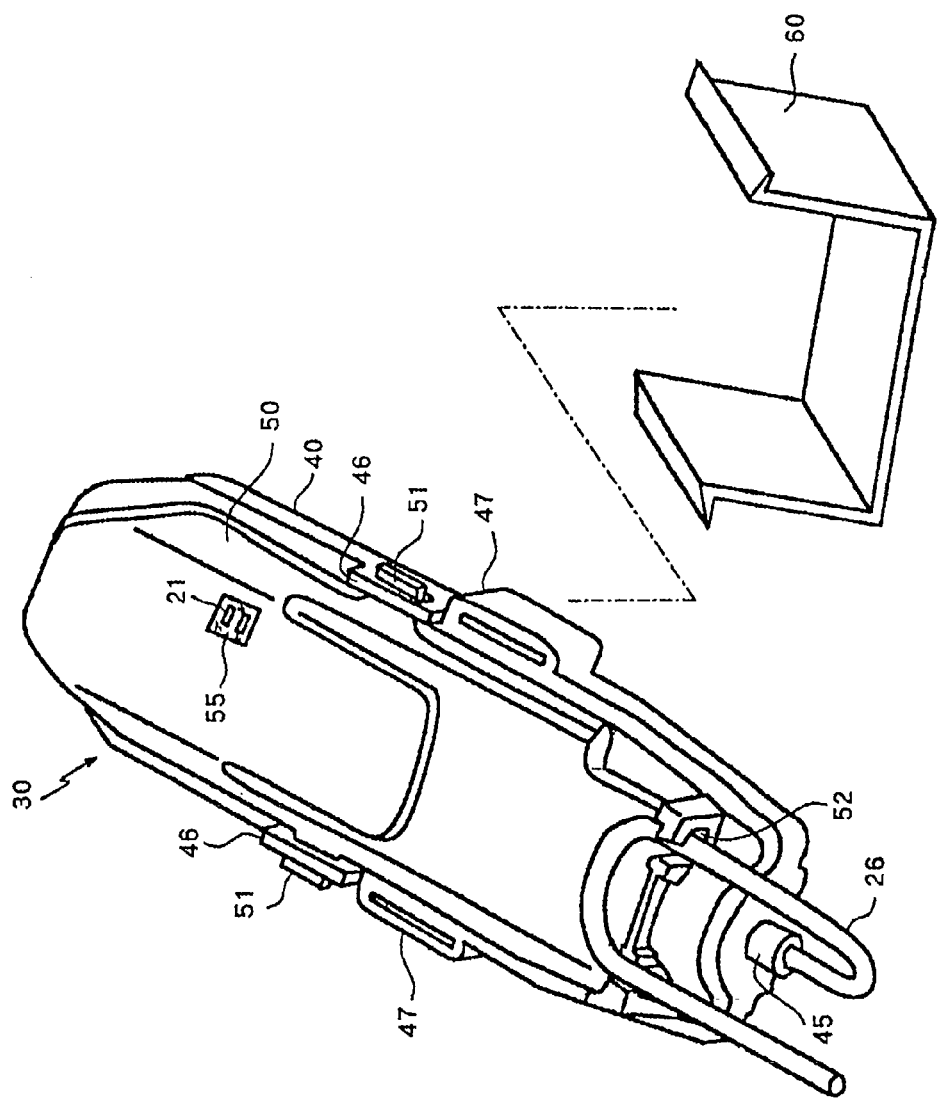
FIG. 8 is a perspective view showing an anti-theft device contained in a case according to an embodiment of the present invention.
Figure 9:
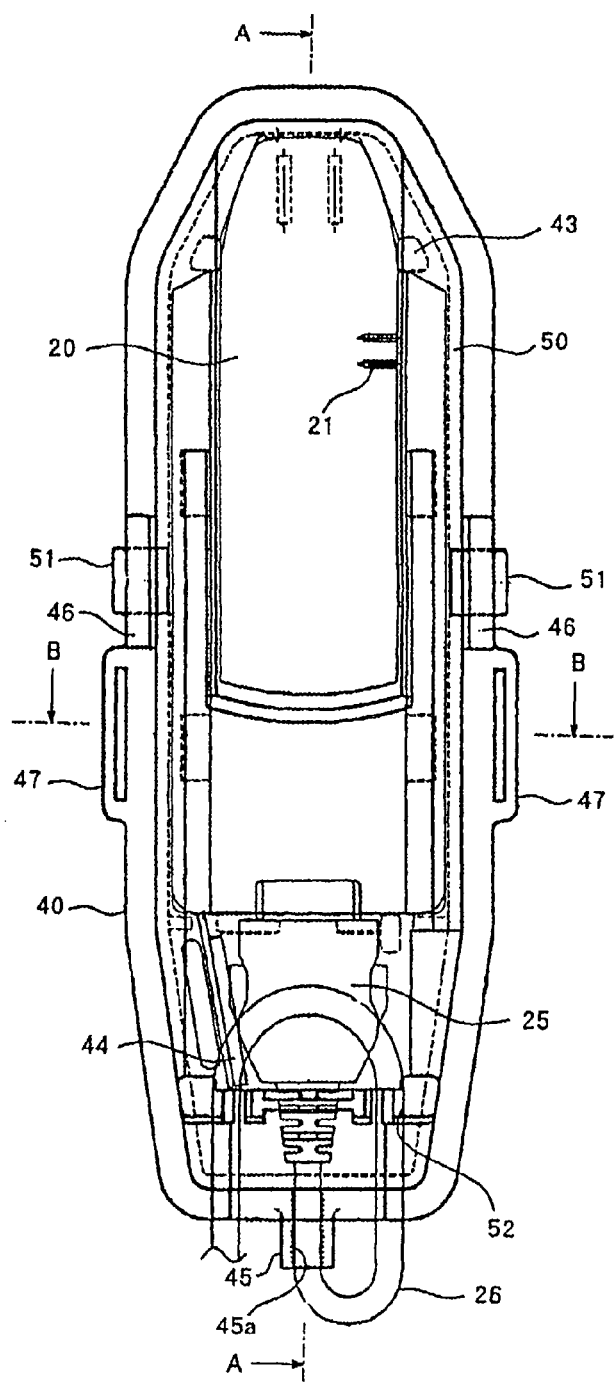
FIG. 9 is a see-through plan view showing an anti-theft device contained in a case according to the present invention.
Figure 10:
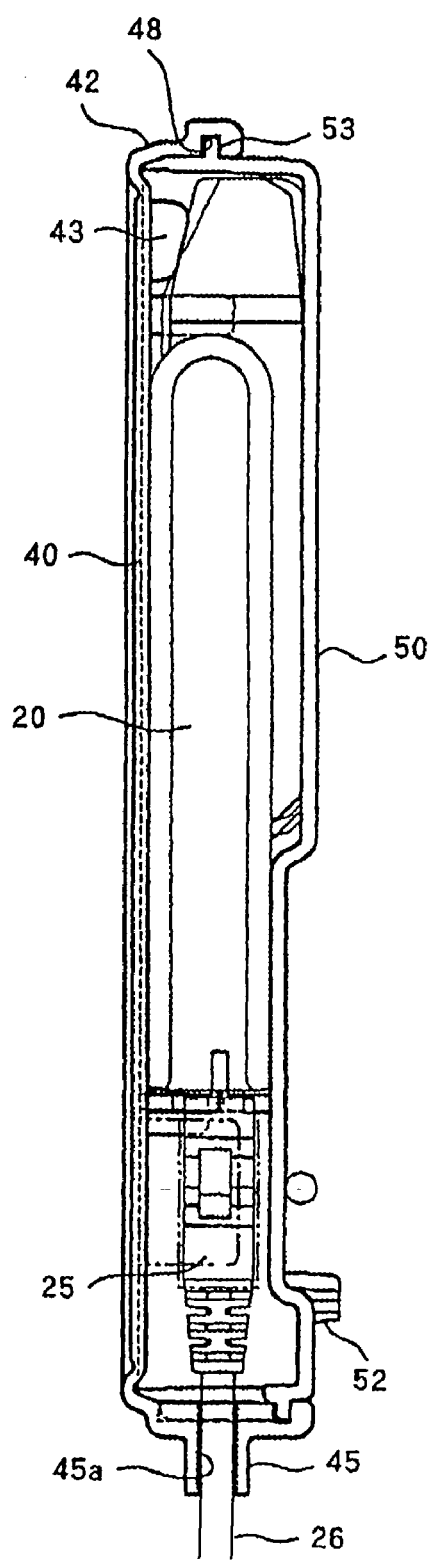
FIG. 10 is a sectional view in the direction of arrows A—A in FIG. 9.
Figure 11:
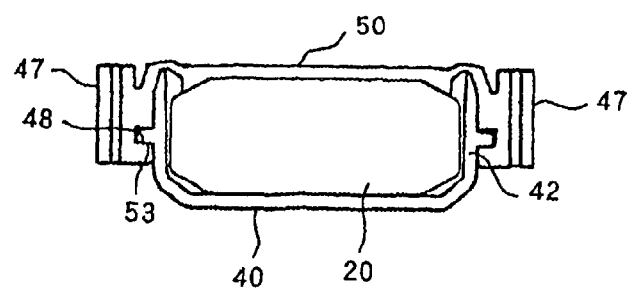
FIG. 11 is a sectional view in the direction of arrows B—B in FIG. 9.
Figure 12:
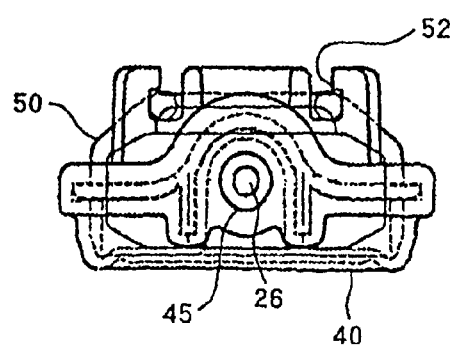
FIG. 12 is a front view from the side of a cylindrical member in FIG. 9.

As shown by the overall view of FIG. 8, the see-through plan view from the side of the cover shown of FIG. 9, the sectional view in the direction of arrows A—A in FIG. 9 shown in FIG. 10, the sectional view in the direction of arrows B—B in FIG. 9 shown in FIG. 11 and the external view from the side of the cylindrical member 45 of FIG. 12, the anti-theft device 20 and the connector 25 are accommodated in the case 30 and the cord 26 passed to the outside through the cylindrical member 45 and looped to engage with the claw-shaped notches 52.

It should be noted that the cover 50 shown in FIG. 8, differently from that shown in FIG. 7, is provided with a window 55 made of transparent resin through which the indicator 21 can be viewed. In other aspects it is the same as the cover 50 shown FIG. 7. In other words, the cover 50 need not be transparent throughout but can adequately ensure visibility of the indicator 21 if transparent at only one portion.

The cover 50 is attached to the holder 40 by engaging the hooks 51 with the gate-like lugs 46. When this engagement is established, watertightness is secured at the mating faces between the cover 50 and holder 40 owing to the intimate engagement produced by the elasticity of the rubber of the flange 53 fitted in the peripheral groove 48.

In addition, the inner surface of the cylindrical member 45 is formed with a projecting ridge 45a. The projecting ridge 45a bites into and deforms the rubber, vinyl or other elastic material constituting the outer covering of the cord 26. Since the projecting ridge 45a therefore establishes close contact with the covering of the cord 26, good watertightness can also be realized at the cylindrical member 45 through which the cord 26 exits.

The anti-theft device 20 can therefore be reliably waterproofed by housing it in the case 30.

As the cord 26 exiting the cylindrical member 45 is looped through the claw-shaped notches 52, moreover, even if a strong pulling is exerted on the cord 26 for some reason, formation of a gap that would impair watertightness by movement of the cord 26 in the cylindrical member 45 can be prevented and faulty contact with the connector 25 can also be prevented because the pulling force is borne by the claw-shaped notches 52.

As can be seen in FIG. 8, the illustrated case 30 is fastened to the motorcycle body side by inserting it into a fastener 60 provided on the body side. The fastener 60 has a pair of hooks that fit into the gate-like lugs 47 of the case 30 to securely fasten the case 30 within the fastener 60 and thus to the motorcycle body side.

Since the gate-like lugs 47 are, like the holder 40, formed of elastic rubber or the like, a vibration damping effect is obtained with respect to vibration from the motorcycle body side.

The anti-theft device 20 housed (or not housed) in the case 30 is attached within a lockable storage portion provided in the motorcycle. For example, it is mounted on the motorcycle using one of the structures shown in FIGS. 13 to 15, which show sectional views of the storage box 5 taken in the lateral direction of the motorcycle.

Figure 13:
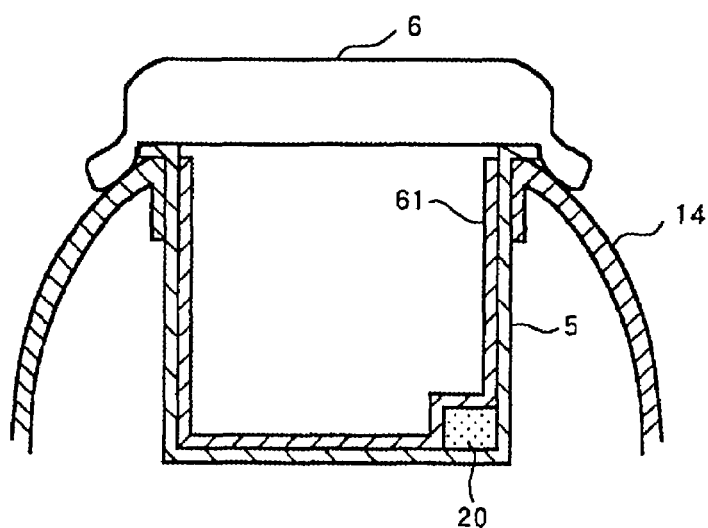
FIG. 13 is a sectional view showing an installation structure for an anti-theft device in accordance with an embodiment of the present invention.

In the example of FIG. 13, the anti-theft device 20 is mounted at a bottom corner of the storage box 5 and is covered by a lining sheet 61 covering the inner surface of the storage box 5. In this case, it is preferable to mount the anti-theft device 20 at a side portion of the storage box 5 substantially at its center in the fore-aft direction of the motorcycle, as illustrated in FIGS. 3 and 4.

When the anti-theft device 20 is installed in the storage box 5 that is lockably closable by the seat 6 in this manner, it can be prevented from detachment by an unauthorized person and be waterproofed to a degree suitable for everyday purposes. Since it is additionally covered by the lining sheet 61, moreover, a high degree of concealment is achieved. On the other hand, the user can easily check the indicator 21 of the anti-theft device 20 by opening the storage box 5 with a key and turning back the lining sheet 61.

Figure 14:
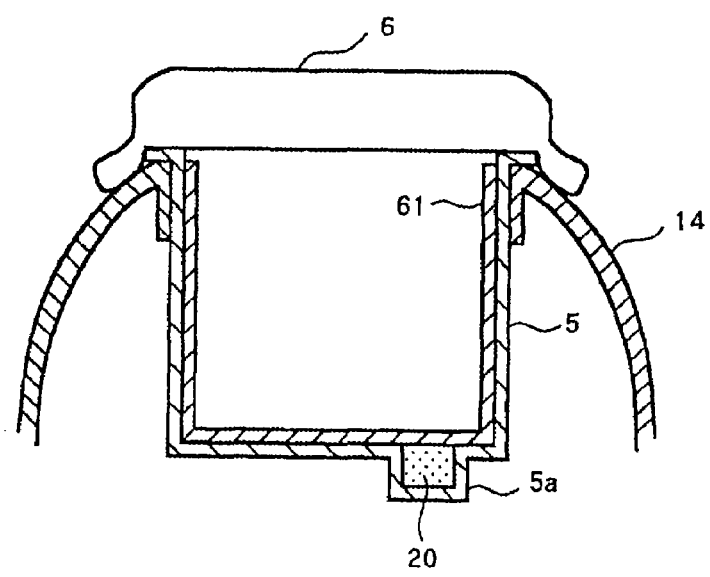
FIG. 14 is a sectional view showing an installation structure for an anti-theft device in accordance with another embodiment of the present invention.

In the example of FIG. 14, a recess 5a is formed in the floor of the storage box 5 and the anti-theft device 20 is fixedly housed in the recess 5a and covered by a lining sheet 61 covering the inner surface of the storage box 5.

As in the first case, when the anti-theft device 20 is installed in the storage box 5 in this manner, it can be prevented from detachment by an unauthorized person and waterproofed to a degree suitable for everyday purposes. Since it is additionally covered by the lining sheet 61, moreover, a high degree of concealment is achieved. On the other hand, the user can easily check the indicator 21. The arrangement has the further advantage that the floor of the storage box 5 can be maintained flat. This upgrades the utility of the storage box 5 and makes the location of the anti-theft device 20 even more difficult for someone else to discern.

Figure 15:
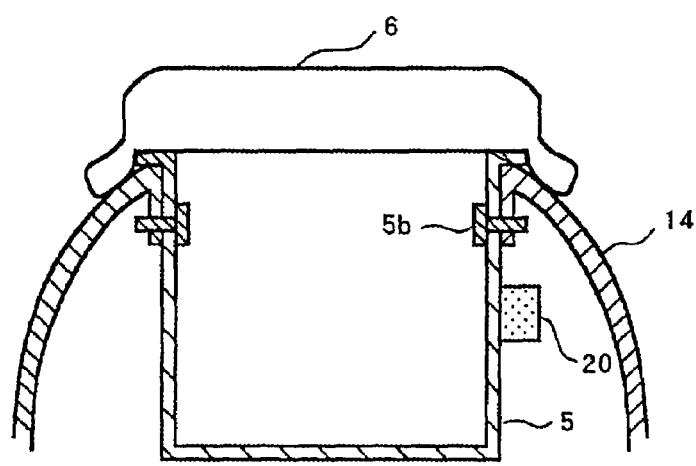
FIG. 15 is a sectional view showing an installation structure for an anti-theft device in accordance with another embodiment of the present invention.

In the example of FIG. 15, the anti-theft device 20 is mounted in the space between the storage box 5 and the rear cover 14. The storage box 5 is fastened to the motorcycle frame by screw plugs 5b or some other type of fastener enabling easy attachment and detachment.

When the anti-theft device 20 is installed in the space between the storage box 5 and the rear cover 14 in this manner, it can be prevented from detachment by an unauthorized person, waterproofed to a degree suitable for everyday purposes, and well concealed Moreover, the user can easily visually check the indicator 21 by a simple operation of undoing the screw plugs 5b and removing the storage box 5.

In the present invention, any of various other lockable sites can also be used as the place for installation of the anti-theft device 20. It can, for example, be mounted in a storage box with lockable cover provided in the front cover 12 or the center cover 13, or in a tool storage space or the like formed between the motorcycle body and a seat that can be locked to the body.

When the holder 40 of the case 30 is formed of an elastic material as set out in the foregoing, the anti-theft device 20 inside the case 30 can be protected from vibration by the elasticity of the holder 40 if the case 30 is attached to the motorcycle body side by its holder 40 side. By using the fastener 60 shown in FIG. 8, moreover, the vibration propagation path can be made indirect and the elasticity enhanced to realize better vibration damping effect. A further improvement in anti-vibration effect can be achieved by adopting a vibration-damping structure utilizing additional elastic bodies.

Figure 16:
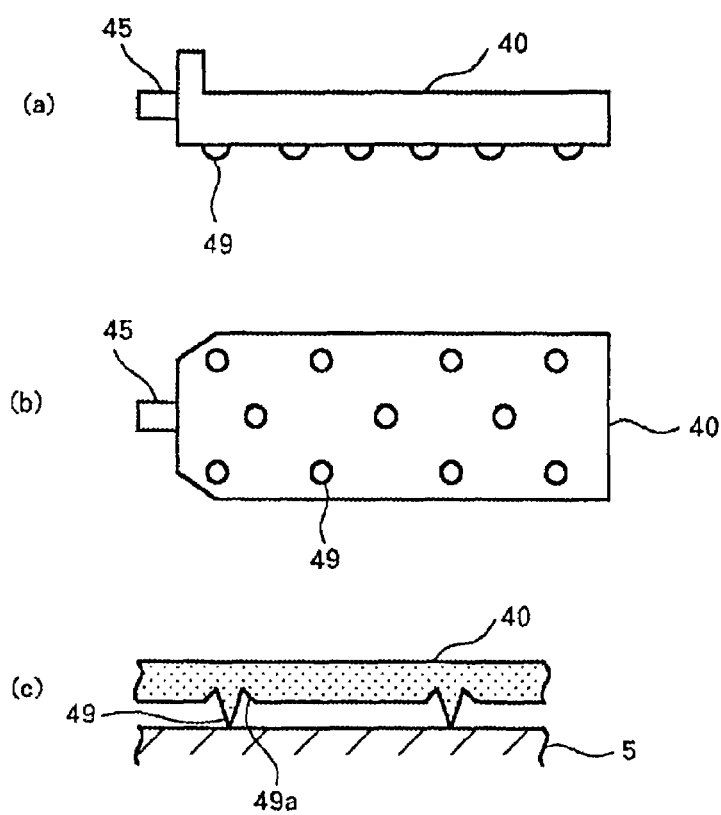
FIG. 16 is a diagram for explaining a case holder anti-vibration structure.

As illustrated in FIG. 16(*a*) showing a side view of the holder 40, FIG. 16(*b*) showing a bottom view thereof and FIG. 16(*c*) showing an enlarged view of the bottom surface of the holder 40 and the inner wall surface of the storage box 5, the transmission of vibration to the case 30 (and the anti-theft device 20 inside) can be reduced by, for example, forming a large number of conical elastic projections 49 on the bottom surface of the holder 40 and placing the case 30 so that the easily deformed tip portions of the elastic projections 49 are in contact with and deformable by the inner wall surface of the storage box 5. In this case, the effect of reducing vibration transmission can be further increased by forming peripheral grooves 49*a* at the bases of the conical elastic projections 49 so as to increase the deformability of the elastic projections 49.

Figure 17:
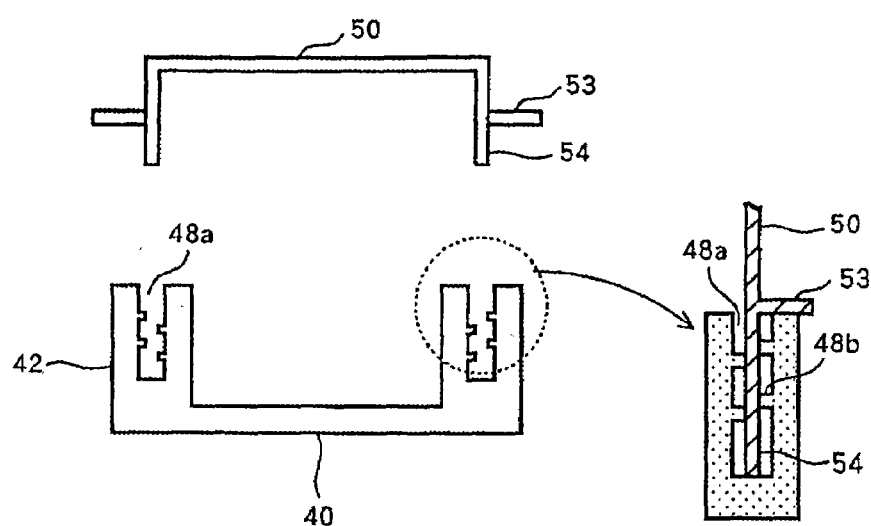
FIG. 17 is a diagram for explaining a case watertight structure.

When, as set out in the foregoing, the flange 53 formed on the cover 50 is snuggly fitted in the peripheral groove 48 formed at the outer periphery of the wall 42, and the projecting ridge 45*a* formed in the cylindrical member 45 is bitingly engaged with the cord 26, invasion of water into the interior of the case 30 is prevented even during extraordinary circumstances such as when the motorcycle is hosed down, Moreover, by adopting a waterproofing structure such as that shown in FIG 17, it becomes possible to prevent condensation of moisture inside the case 30.

This structure is obtained by forming a peripheral groove 48*a* in the distal edge of the wall 42, forming staggered projections 48*b* on the inner surfaces of the peripheral groove 48*a*, attaching the cover 50 to the holder 40 by inserting the periphery of the cover 50 into the peripheral groove 48*a* to make intimate contact with the projections 48*b*, and abutting the flange 53 onto the peripheral edge of the wall 42 (i.e., the edge of the peripheral groove 48*a*), thereby attaching the holder 40 to the cover 50.

By this, the flange 53 forms an eave that prevents water from entering the peripheral groove 48*a*, while the labyrinth passage formed by the staggered projections 48*b* and notches formed in a wall 54 allows moisture inside the case 30 to escape to the exterior.

Figure 18:
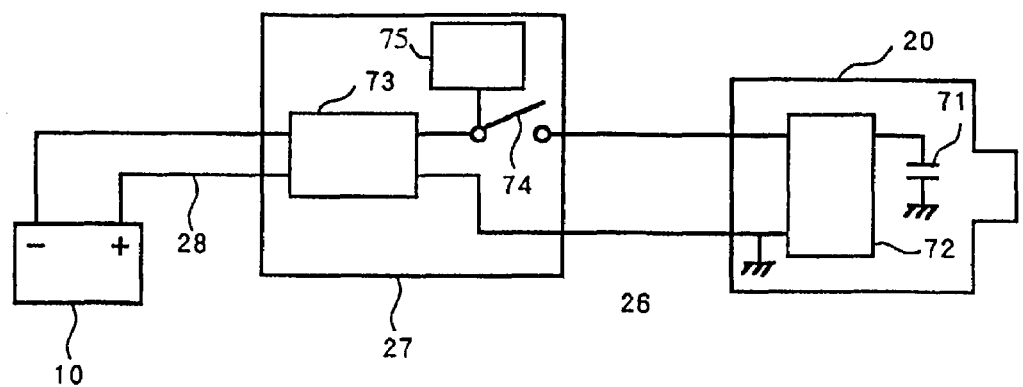
FIG. 18 is a circuit diagram for explaining the electrical system between an anti-theft device and an onboard battery.

FIG. 18 shows the configuration of an onboard charger 27 suitable for use with the anti-theft device 20 installed in the motorcycle.

An internal battery 71 of the anti-theft device 20 is connected to the onboard charger 27 through an internal transformer 72 and the cord 26. The onboard charger 27 is connected to the onboard battery 10 by a cord 28. The voltage of the onboard battery 10 is transformed (stepped down from 12V to 5.2V, for example) by a transformer 73 in the onboard charger 27 and then transformed (stepped down from 5.2V to 4.2V, for example) by the internal transformer 72, whereafter it is used to charge the internal battery 71.

If charging voltage is constantly applied to the internal battery 71, the control circuit (e.g., microcomputer) of the anti-theft device 20 may be prevented from periodically entering sleep mode, i.e., may not enter the low power consumption operating mode but operate continuously to consume a large amount of energy. As this would put a drain on the onboard battery 10, it might become a major problem in the case of a motorcycle whose onboard battery 10 is of relatively small capacity. In the case of using a lithium ion battery as the internal battery 71, moreover, the service life of the internal battery 71 will be affected if charging is conducted under high-temperature condition of 40° C. or higher or under low-temperature condition of −5° C. or below. The internal transformer 72 is therefore designed not to charge the internal battery 71 under such temperature conditions. In fact, however, the likelihood of the motorcycle being used or stored under such high or low temperature conditions is high.

The onboard charger 27 is therefore equipped with a control unit 75 and a switch 74 for making and breaking connection with the anti-theft device 20. The control unit 75 turns the switch 74 ON at certain time intervals to check the charge condition of the internal battery 71. It keeps the switch 74 off at all other times. This enables the control circuit of the anti-theft device 20 to go into sleep mode and therefore prevents waste of onboard battery 10 power.

The onboard charger 27 can be further equipped with a control unit that prevents the switch 74 from being turned ON when the measured temperature is outside a prescribed temperature range, thereby preventing charging of the internal battery 71 at other than allowable temperatures.

The control unit 75 used can be one that controls the charge condition checking process so as to check the charge condition of the internal battery 71 at normal intervals (e.g., once every 36 hours), shorten the check interval (e.g., to once every 6 hours) if the result in a prescribed number of consecutive checks (e.g. 3 checks) is that the battery cannot be charged, decide that the internal battery 71 or the anti-theft device 20 is faulty if the result in a prescribed number of these checks (e.g., 5 checks) consecutively indicate that the battery cannot be charged, and upon deciding that a fault has occurred issue a warning through the indicator 21 or set off an audible alarm. Since a day has 24 hours, the fact that the normal check interval is set at 36 hours means that if, for example, a charge condition check is made during the heat of a summer day, the next charge condition check will be made in the cool of the morning. As a result, the ratio of charge condition checks and battery chargings conducted under suitable temperature conditions is increased.

The control of the charge condition check interval for determining whether or not the internal battery 71 can be charged will be explained in further detail.

The processing for this control can be viewed as an invention of a battery charging method or battery charger that carries out charge condition checks at preset intervals under the control of a microcomputer-based control unit 75 that conducts control processing in accordance with a prescribed program.

The interval between charge condition checks and the method for controlling the interval can be defined in any of various ways. Typical ones are explained further in the following.

In the first embodiment of the battery charging method or battery charger controlled by control means, the method or charger regularly conducts battery charge condition checks at prescribed intervals. The interval between consecutive charge condition check operations is defined to be offset from 24 hours (1 day) so that each charge condition check operation is conducted at a different time of the day from the preceding one and so that the time offsets accrue during repeated check operations at the defined interval to return the time of day when the check operation is conducted to the original one.

The time offset (i.e., interval) can be set to any of various time periods. However, it should be defined with consideration to the fact that battery charging efficiency is temperature dependent, i.e., varies with the temperature of the battery environment (the dependence being particularly pronounced in the case of a lithium ion battery), and that, therefore, the optimum charging condition cannot be detected by repeatedly conducting checks at times when the charging efficiency is worst. From this viewpoint, the interval should preferably be set at a value obtained by dividing 24 hours (1 day) by a natural number not smaller than 2. Among these preferable interval values (12, 8, 6, . . . ), 6 hours is particularly preferable.

Generally, the pattern of air temperature change in the course of a day is such that the temperature is lowest just before sunrise, rises progressively thereafter to peak somewhere between noon and two in the afternoon, falls from after two into the early evening and then continues to fall until early the following morning. This daily air temperature change pattern can be viewed as being divided into four six-hour time periods: morning, midday, evening and night. By defining the interval between consecutive charge condition check operations as a value obtained by dividing 24 hours (1 day) by a natural number not smaller than 2, therefore, the check operations can be conducted during different time periods to prevent bias caused by the battery temperature dependence.

When the interval is set shorter than the 6 hours, i.e., shorter than the length of each time period, two or more check operations are repeated during each time period. This is unnecessary because the air temperature usually does not change much during one and the same time period and is liable to be detrimental because each check operation switches the communications facility of the anti-theft device from the sleep mode to the more energy-hungry normal operating mode, which puts a heavier power drain on the onboard battery. From this viewpoint and in light of the advantage that checks can be carried out under the characteristic temperature conditions of the respective time periods, it is preferable to set the interval between consecutive charge condition checks at 6 hours.

In another embodiment of the battery charging method or battery charger controlled by control means, the time period during which each check operation is conducted is shifted relative to the preceding one by offsetting the interval between consecutive charge condition check operations by less than 24 hours relative to the per-charge battery service life of a prescribed number of days (24 hours×number of days), the interval being defined such that the time of day when the check operation is conducted returns to an earlier one after a prescribed number of check operations constituting one set. When it is deemed unnecessary to conduct check operations in all of the four time periods of one day, a check operation can be conducted in at least one of the four time periods.

In this case, the interval is preferably defined so that the offset is a natural number multiple of 6 hours.

In another embodiment of the battery charging method or battery charger controlled by control means, the interval between consecutive charge condition check operations is defined to be a time period other than a natural number multiple of 24 hours or a time period other than a divisor of 24 hours. As this enables the repeatedly conducted test operations to be conducted at different times of day, bias caused by the battery temperature dependence can be avoided.

In the case of some control unit configurations, and also in the case where the anti-theft device is installed in a motorcycle that is exposed to intense temperature variation, the length of the interval itself may shift owing to the temperature dependence of the control unit (its timer circuit, for example). In such cases, the time of day at which check operations are conducted is similarly changed even if the interval is defined as a divisor 24 hours.

When the check operation determines that the battery can be charged, a battery charging operation is conducted. The charging operation is conducted while monitoring the battery voltage and current values and can be continued up to full charge, or be continued until the charged amount of power becomes substantially equal to the amount of power consumed during the check operation time interval, or be continued until the charged amount of power becomes substantially equal to the amount of power consumed during the time period of a plurality of check operation intervals. Comparing the case where charging is continued until the charged amount of power becomes substantially equal to the amount of power consumed during the check operation time interval and the case where charging is continued until the charged amount of power becomes substantially equal to the amount of power consumed during the time period of a plurality of check operation intervals, the later case better ensures that the battery will not run out of power before the end of the succeeding interval, despite the drawback that satisfactory charging may not be achieved owing to improper (too high or too low) temperature at the time of the charging operation.

Embodiments in which multiple types of intervals are defined, including ones of normal and shorter than normal time periods, will now be explained with reference to FIG. 19.

As shown regarding the first Embodiment in FIG. 19, when the normal interval is defined as 36 hours, since the interval is longer than one day (24 hours) by 12 hours (a half-day), it follows that at the end of the first interval 36 hours (one and a half days) later, the offset relative to the preceding operation time point is 12 hours, and at the end of the second check operation interval 72 hours (three days) later, the check operation time point returns to that at the start.

During the charging operation that accompanies the check operation, the voltage and current values of the battery are monitored to detect whether or not sufficient charging has been conducted and the result of the detection is sent to the control unit 75. When the control unit 75 judges based on the detection results that charging was impossible or insufficient during a prescribed number of consecutive intervals following the last time that charging was possible (the number of consecutive intervals is two in this embodiment but can be greater), the succeeding check operations are conducted at a shorter interval. As explained earlier, the shorter interval is preferably 6 hours.

When the control unit 75 thereafter judges based on the results of the check operations that charging was impossible or insufficient during a prescribed number of consecutive short intervals (the number of consecutive intervals is two in this embodiment but can be a different number), it decides that the internal battery 71 or the anti-theft device 20 is faulty and implements an appropriate measure such as explained earlier.

When charging becomes possible or sufficient charging is achieved in the course of the check operations repeatedly conducted at short intervals before the prescribed number of check operations has been completed, the control unit 75 preferably restores the check operation to the normal interval (36 hours).

As shown regarding the second Embodiment in FIG. 19, when the normal interval is defined as 30 hours, since the interval is longer than one day (24 hours) by 6 hours (¼ day), it follows that at the end of the second interval 60 hours (two and a half days) later, the offset relative to the preceding operation time point is 12 hours, and at the end of the fourth check operation interval 120 hours (five days) later, the check operation time point returns to that at the start.

Similarly to the fint Embodiment, when the control unit 75 judges that charging was impossible or insufficient during a prescribed number of consecutive intervals following the last time that charging was possible (the number of consecutive intervals is four in this embodiment but can be greater), the succeeding check operations are conducted at a shorter interval. As explained earlier, the shorter interval is preferably 6 hours.

When the control unit 75 thereafter judges based on the results of the check operations that charging was impossible or insufficient during a prescribed number of consecutive short intervals, it decides that the internal battery 71 or the anti-theft device 20 is faulty and implements an appropriate measure such as explained earlier. When charging becomes possible or sufficient charging is achieved in the course of the check operations repeatedly conducted at short intervals before the prescribed number of check operations has been completed, the control unit 75 preferably restores the check operation to the normal interval (30 hours).

Figure 19:
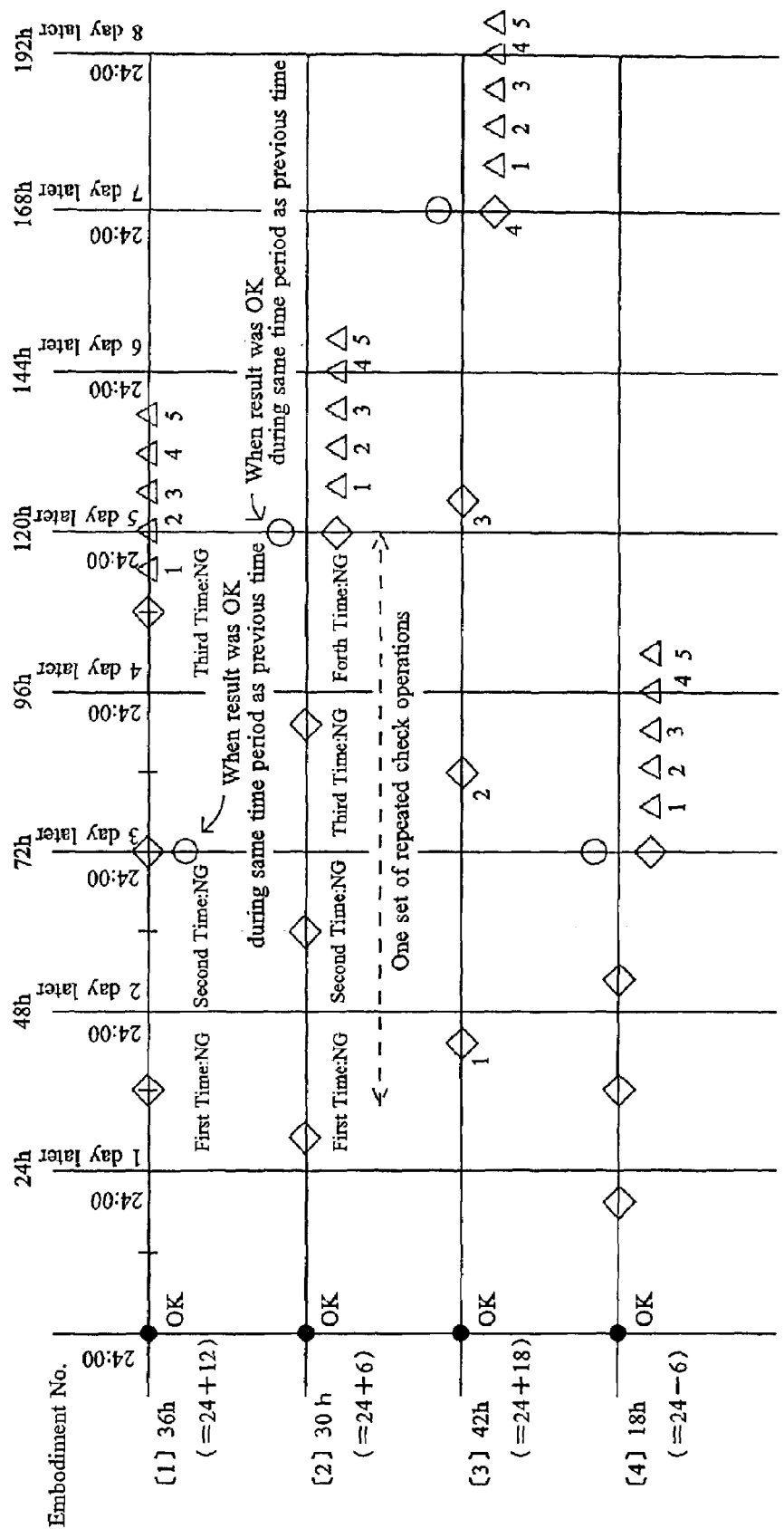
FIG. 19 is a diagram for explaining intervals between charge condition checks.

Operations similar to the foregoing are also conducted under the control of the control unit 75 in the case of a third Embodiment and a fourth Embodiment in FIG. 19, in which the normal interval is defined as 42 hours and 18 hours, respectively.

Depending on the dark current value of the wireless telecommunications unit of the anti-theft device 20, the battery capacity and other factors, the interval can be set to the relatively long value of 42 hours obtained by adding three times 6 hours, i.e., 18 hours, to the 24 hours of one day. Alternatively, it can be set to the relatively short value of 18 hours obtained by subtracting 6 hours from 24 hours.

Although the present invention has been explained taking an anti-theft device as an example, the present invention can be broadly applied to wireless telecommunications devices that are powered by an onboard vehicle battery. Particularly when adopting a system in which the battery powering the wireless telecommunications device is charged by another battery mounted in the vehicle, the foregoing invention relating to charge condition check interval effectively prevents waste of the other onboard battery, thereby preventing impairment of the vehicle's basic performance.

The foregoing check operation control can also be viewed as an invention of a method or charger that repeatedly conducts battery charge condition check operations (including chargeability discrimination and battery charging operation) at prescribed intervals, which method or charger establishes in control means for controlling the check operation first to fourth time period segments each consisting of a 6-hour time unit obtained by dividing a 24-hour day into four equal segments, a first mode in which one check operation is conducted per a plurality of units of the time period segments (6 units, for example) and a second mode in which one check operation is conducted per a smaller number of time period segment units (1 unit, for example), and the control means conducts control by the first mode when it judges that charging was possible (normal condition in which charging was conducted normally) at the preceding check operation or judges that the number of consecutive preceding operations in which the condition was found not to be normal is less than a first prescribed number of operations, and conducts control by the second mode when it judges that the number of consecutive earlier operations in which the condition was found not to be normal is equal to or greater than the first prescribed number of operations.

The method or charger can further be one in which the control means judges that the battery to be charged (battery or telecommunications unit) is faulty when the number of check operations after changing to the second mode in which the condition was found not to be normal becomes greater than a second prescribed number of operations.

The method or charger can further be one in which the control means, upon judging in a check operation that charging is possible, fully charges the battery or charges the battery with an amount of power substantially equal to the amount of power consumed during the plurality of consecutive intervals.

As explained in the foregoing, the present invention makes it possible to install an anti-theft device in a motorcycle so that it cannot be discovered and detached by an unauthorized person, to protect the anti-theft device from damage by isolation from vibration and waterproofing, and to enable the anti-theft device to perform its functions while effectively utilizing the limited space available in a motorcycle.

The anti-theft device installation structure for motorcycle of the present invention further enables effective battery charging and, particularly in the case of charging a wireless telecommunications device battery using an onboard battery, makes it possible to prevent waste of onboard battery power, to prevent waste of battery power by preventing unnecessary wakeup of the wireless telecommunications device from the sleep mode, and to realize appropriate charging of the wireless telecommunications device battery.

What is claimed is:

1. An anti-theft structure for a motorcycle, comprising:
a motorcycle body;
an onboard battery installed on the motorcycle;
a receptacle fanned in the motorcycle body;
an openable cover mounted on the receptacle, wherein the cover can be locked so as to secure the receptacle; and
an anti-theft device installed in the receptacle for reporting a position of the motorcycle by wirelessly transmitting at least identifying information, the anti-theft device being electrically connected to the onboard battery and having an internal battery.

2. A structure according to claim 1, wherein the structure further comprises a case for holding the anti-theft device, the case having a transparent portion to permit an indicator of the anti-theft device to be viewed, wherein at least a portion of the case is formed of an anti-vibration material to be attached to a surface of the motorcycle body.

3. A structure according to claim 1, further comprising a case for holding the anti-theft device, the case comprising a holder to be attached to a surface of the motorcycle body and a cover attachable to the holder by a waterproof structure, wherein at least a portion of the holder to be attached to a surface of the motorcycle body is formed of an anti-vibration material and the cover has a transparent portion through which an indicator of the anti-theft device can be viewed.

4. A structure according to claim 2, wherein a portion of the case that faces the motorcycle body is provided with a cushioning material.

5. A structure according to claim 3, wherein a portion of the case that faces the motorcycle body is provided with a cushioning material.

6. A structure according to claim 2, further comprising a cord for interconnecting the anti-theft device and an onboard battery of the motorcycle, wherein the cord extends out of the case, and then loops through an engagement member of the case, and then continues on toward the onboard battery.

7. A structure according to claim 3, further comprising a cord for interconnecting the anti-theft device and an onboard battery of the motorcycle, wherein the cord extends out of the case, and then loops through an engagement member of the case, and then continues on toward the onboard battery.

8. A structure according to claim 4, wherein the case is provided with an engagement member and a cord for interconnecting the anti-theft device and an onboard battery of the motorcycle,
    wherein the cord exits from the case, loops through the engagement member, and continues toward the battery side.

9. A structure according to claim 1, wherein the anti-theft device is installed between a wall of the receptacle and a lining sheet covering the wall.

10. A structure according to claim 2, wherein the anti-theft device is installed between a wall of the receptacle and a lining sheet covering the wall.

11. A structure according to claim 1, wherein the receptacle is formed with an internal recess, the anti-theft device is installed in the recess of the receptacle, and an opening of the recess is covered with a covering member.

12. A structure according to claim 1, wherein the receptacle is formed with an internal recess and the anti-theft device is installed in the recess of the receptacle.

13. An anti-theft structure for a motorcycle, comprising:
    a motorcycle body;
    an onboard battery installed on the motorcycle;
    a receptacle formed in the motorcycle body;
    an openable cover mounted on the receptacle, wherein the cover can be locked so as to secure the receptacle;
    a case disposed in the receptacle and having an opening at one end thereof;
    an anti-theft device having an internal battery and being operable to report a position of the motorcycle by wirelessly transmitting at least identifying information, wherein the anti-theft device is disposed in the case; and
    a cord extending through the opening of the case and electrically connecting the onboard battery and the anti-theft device.

14. The anti-theft structure according to claim 13, further comprising a connector disposed interiorly of the case and adjacent the case opening, wherein the connector is connected to a first end of the cord and is dimensioned so as to be larger than a diameter of the case opening.

15. The anti-theft structure according to claim 14, wherein a second end of the cord is directly connected to the onboard battery.

16. The anti-theft structure according to claim 13, wherein an outer portion of the case defines a holding portion for holding a portion of the cord in a U-shape.

17. The anti-theft structure according to claim 13, further comprising an onboard charger installed on the motorcycle body, the charger being electrically connected between the onboard battery and the anti-theft device, wherein the internal battery can be charged by power from the onboard battery.

18. The anti-theft structure according to claim 17, wherein the onboard charger comprises a transformer for decreasing a power supply voltage and a switch for permitting intermittent charging of the internal battery.

19. An anti-theft structure for a motorcycle, comprising:
    a motorcycle body;
    a receptacle formed in the motorcycle body;
    an openable cover mounted on the receptacle, wherein the cover can be locked so as to secure the receptacle;
    a case mounted in the receptacle and having a transparent portion, wherein at least a portion of the case is formed of an anti-vibration material; and
    an anti-theft device disposed in the case so that an indicating portion of the anti-theft device can be viewed through the transparent portion, the anti-theft device being operable to report a position of the motorcycle by wirelessly transmitting at least identifying information thereof.

20. A structure according to claim 19, further comprising a cord for interconnecting the anti-theft device and an onboard battery of the motorcycle, wherein the cord extends out of the case, and then loops through an engagement member of the case, and then continues on toward the onboard battery.

21. A structure according to claim 20, wherein the case comprises a holder and a cover that is attachable to the holder via a waterproof connection.

22. A structure according to claim 19, wherein the case comprises a holder and a cover that is attachable to the holder via a waterproof connection.

* * * * *